United States Patent
Rodgers (10) Patent No.: US 12,008,048 B2
(45) Date of Patent: Jun. 11, 2024

(54) DRILL BACK TO ORIGINAL AUDIO CLIP IN VIRTUAL ASSISTANT INITIATED LISTS AND REMINDERS

(71) Applicant: Oracle International Corporation, Redwood Shores, CA (US)

(72) Inventor: Michael Patrick Rodgers, Rochester, MN (US)

(73) Assignee: Oracle International Corporation, Redwood Shores, CA (US)

( * ) Notice: Subject to any disclaimer, the term of this patent is extended or adjusted under 35 U.S.C. 154(b) by 499 days.

(21) Appl. No.: 17/140,783

(22) Filed: Jan. 4, 2021

(65) Prior Publication Data
US 2022/0215056 A1   Jul. 7, 2022

(51) Int. Cl.
G06F 16/9038   (2019.01)
G10L 15/06     (2013.01)
G10L 15/22     (2006.01)

(52) U.S. Cl.
CPC .......... *G06F 16/9038* (2019.01); *G10L 15/22* (2013.01); *G10L 2015/0631* (2013.01); *G10L 2015/223* (2013.01); *G10L 2015/228* (2013.01)

(58) Field of Classification Search
None
See application file for complete search history.

(56) References Cited

U.S. PATENT DOCUMENTS

| 5,355,311 A * | 10/1994 | Horioka | G06V 30/194 |
| | | | 706/55 |
| 5,602,963 A | 2/1997 | Bissonnette et al. | |
| 6,438,520 B1 * | 8/2002 | Curt | G10L 15/187 |
| | | | 704/256.1 |
| 9,009,592 B2 | 4/2015 | Friend et al. | |
| 9,318,108 B2 | 4/2016 | Gruber et al. | |

(Continued)

FOREIGN PATENT DOCUMENTS

CN   114283810 A *   4/2022   ........... G10L 15/063

OTHER PUBLICATIONS

Record and replay: How a Canadian-made app is aiming to help Alzheimer's patients improve their daily lives, available online at <https://www.theglobeandmail.com/canada/article-toronto-teams-hippocamera-a-high-tech-memory-aid-for-alzheimers/>, 5 pages.

(Continued)

*Primary Examiner* — Daniel C Washburn
*Assistant Examiner* — Oluwadamilola M Ogunbiyi
(74) *Attorney, Agent, or Firm* — Invoke (57) ABSTRACT

A system drills back to an original audio clip in lists and reminders initiated by a virtual assistant. The system may receive audio input comprising a first request. Based on the first request, the system may schedule an action to be performed by the virtual assistant platform. The system stores at least a portion of the audio input and a mapping between the action and at least the portion of the audio input. The system performs the action. Subsequent to performing the action, the system receives a second request for audio playback of the first request corresponding to the action. The system retrieves at least the portion of the audio input based on the mapping between the action and at least the portion of the audio input, and plays at least the portion of the audio input comprising the first request.

22 Claims, 4 Drawing Sheets

(56) References Cited

U.S. PATENT DOCUMENTS

| | | | |
|---|---|---|---|
| 10,733,987 B1* | 8/2020 | Govender | G10L 17/06 |
| 11,044,567 B1* | 6/2021 | Li | G10L 25/51 |
| 11,218,666 B1* | 1/2022 | Haas | G06V 40/28 |
| 11,398,239 B1* | 7/2022 | Garrod | G06F 16/90332 |
| 11,551,685 B2* | 1/2023 | Rastrow | G10L 15/22 |
| 11,574,637 B1* | 2/2023 | Kumar | G10L 15/22 |
| 2006/0116877 A1* | 6/2006 | Pickering | G10L 15/08 |
| | | | 704/231 |
| 2009/0187410 A1* | 7/2009 | Wilpon | G10L 15/30 |
| | | | 704/270.1 |
| 2010/0169359 A1* | 7/2010 | Barrett | G06F 16/313 |
| | | | 707/769 |
| 2010/0274469 A1* | 10/2010 | Takahata | G01C 21/3896 |
| | | | 701/532 |
| 2012/0035925 A1* | 2/2012 | Friend | G06F 16/68 |
| | | | 704/235 |
| 2012/0265535 A1 | 10/2012 | Bryant-Rich et al. | |
| 2014/0222436 A1 | 8/2014 | Binder et al. | |
| 2015/0040012 A1* | 2/2015 | Faaborg | G10L 15/1815 |
| | | | 715/728 |
| 2015/0162000 A1 | 6/2015 | Marti et al. | |
| 2016/0093289 A1* | 3/2016 | Pollet | G10L 13/08 |
| | | | 704/260 |
| 2016/0225370 A1* | 8/2016 | Kannan | G10L 15/18 |
| 2018/0315417 A1* | 11/2018 | Flaks | G10L 15/063 |
| 2019/0013008 A1* | 1/2019 | Kunitake | G10L 15/08 |
| 2019/0213997 A1* | 7/2019 | Aaron | G10L 15/01 |
| 2019/0236412 A1* | 8/2019 | Zhao | G06F 18/24 |
| 2020/0020329 A1* | 1/2020 | Gordon | G10L 25/51 |
| 2020/0027456 A1 | 1/2020 | Kim et al. | |
| 2020/0152175 A1* | 5/2020 | Dernoncourt | G10L 15/075 |
| 2020/0175961 A1* | 6/2020 | Thomson | G10L 15/28 |
| 2020/0294497 A1 | 9/2020 | Kirazci et al. | |
| 2020/0349943 A1 | 11/2020 | Elangovan et al. | |
| 2021/0065679 A1* | 3/2021 | Finlay | G10L 15/02 |
| 2021/0124803 A1* | 4/2021 | Alloh | G06F 40/247 |
| 2021/0360109 A1* | 11/2021 | Rico Ródenas | H04M 3/5191 |
| 2022/0101835 A1* | 3/2022 | Freed | G10L 15/063 |
| 2022/0238088 A1* | 7/2022 | Danjyo | G09B 15/00 |
| 2022/0310089 A1* | 9/2022 | Aleksic | G06F 3/167 |

OTHER PUBLICATIONS

Vemuri et al., "An Audio-Based Personal Memory Aid," MIT Media Lab 20 Ames St. Cambridge, MA 02139 USA, 18 pages.

Vemuri et al., "Improving Speech Playback Using Time-Compression and Speech Recognition," CHI Paper, vol. 6, No. 1, Apr. 24-29, 2004, pp. 295-302.

* cited by examiner

DRILL BACK TO ORIGINAL AUDIO CLIP IN VIRTUAL ASSISTANT INITIATED LISTS AND REMINDERS

TECHNICAL FIELD

The present disclosure relates to virtual assistants. In particular, the present disclosure relates to providing an original audio recording of audio input that caused a virtual assistant to create content intended to be reviewed in the future.

BACKGROUND

A virtual assistant is a software agent used to perform tasks. A virtual assistant may accept an instruction from a user via voice commands and/or text commands. Voice commands may be received by a smart speaker. Alternatively, a virtual assistant may receive commands from a user via text commands typed into a chat interface. Generally, a virtual assistant executes a simple task responsive to a request. For example, responsive to the voice command "What is the weather like today?" a virtual assistant obtains, and reads, today's weather forecast.

The virtual assistant may also be used to create content, such as lists and reminders, that a user intends to review at a future time. For example, a user may add items to a shopping list with the intention of reviewing the list contents at a supermarket. As another example, a user may provide a voice command "Remind me to call John at noon tomorrow," with the intention to review that reminder when it is presented at noon the following day.

The virtual assistant may use a particular application or module for executing a specific task. As examples, virtual assistants invoke stand-alone applications to find directions, check the weather, and update a calendar. A virtual assistant may determine the user's intent to identify a task to execute. The virtual assistant may determine the intent using sample utterances. As an example, an application called lookupBalance is invoked based the sample utterance, "What is the balance of my checking account?".

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. VIRTUAL ASSISTANT SYSTEM
3. DRILL BACK TO AUDIO RECORDING IN VIRTUAL ASSISTANT
4. EXAMPLE EMBODIMENT
5. MISCELLANEOUS; EXTENSIONS
6. HARDWARE OVERVIEW

1. General Overview

One or more embodiments replay previously received audio input that was used for configuring or scheduling a task. In an example, a virtual assistant receives an initial command from a user, via audio input, to perform a task. The task may include, for example, setting a reminder to do something at a particular time. The virtual assistant stores the audio input in association with information corresponding to the task. Subsequent to performing the task, the virtual assistant receives a request to provide additional information corresponding to the initial command. The virtual assistant identifies the stored audio input based on a stored mapping between information corresponding to the task and the audio input. The virtual assistant then plays the audio input, received from the user, back to the user.

The storage and playback of the audio input may be useful when the task performed by the virtual assistant is insufficient and/or incorrect. In an example, an initial command spoken by a user includes "remind me to call Joe at 5 pm". The virtual assistant misinterprets the initial command and instead plays a reminder at 5 pm that states "this is a reminder to call Mo." Not recognizing the reminder, the user may submit a request for the playback of the initial command. When the initial command, received from the user, is played to the user, the user is able to understand that the reminder is for calling Joe, not Mo. The initial command may also specify details that were not included in the reminder played by the virtual assistant. In an example, the initial command may have stated "remind me to call Larry to talk about the sale of the house" while the reminder played by the virtual assistant may have only stated "this is a reminder to call Larry." Accordingly, storage and playback of the initial command by the virtual assistant helps the user obtain additional information relevant to the reminder task.

In another example, an initial command spoken by a user includes "add treat to my grocery list." The virtual assistant misinterprets the initial command and adds "wheat" to the user's grocery list. At a later time, when the user is viewing the grocery list and sees "wheat" on the grocery list, the user requests additional information regarding the "wheat" entry within the grocery list. Based on a stored mapping between the "wheat" entry and the stored initial command, the virtual assistant identifies the initial command for playback. The system plays back the user's initial command "add treat to my grocery list" which in turn helps the user identify the correct item to be purchased.

One or more embodiments play or present any contextual information associated with the receipt of the initial command from a user. As an alternative to or in addition to the playback of the initial command, the virtual assistant may (a) present the geo-location of the user and/or the virtual assistant when the initial command was received, or (b) the time at which the initial command was received. The virtual assistant may present device information corresponding to a time at which the initial command was received. The device information may include, for example, the set of applications being executed when the initial command was received, the last application accessed by the user prior to receipt of the initial command, or a configuration of the device when the initial command was received.

One or more embodiments described in this Specification and/or recited in the claims may not be included in this General Overview section.

2. Virtual Assistant System

Figure 1:
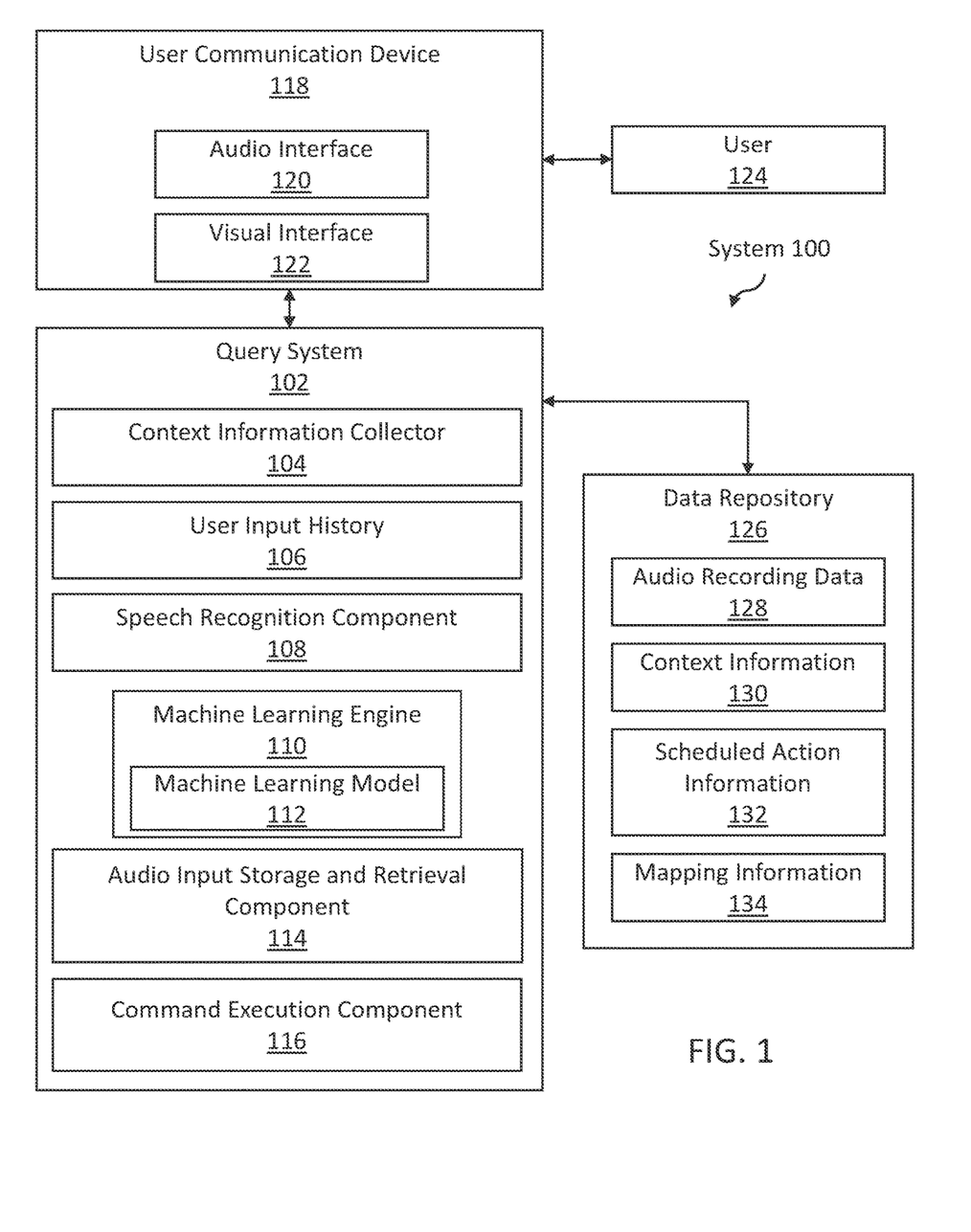
FIG. 1 illustrates a system in accordance with one or more embodiments.

FIG. 1 illustrates a system 100 in accordance with one or more embodiments. As illustrated in FIG. 1, system 100 includes a query system 102, user communication device 118, and data repository 126. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the system 100 executes a task, based on input from a user 124. Example tasks include making a travel arrangement, giving directions, displaying a requested image, setting reminders, creating shopping lists and adding items to those lists. One or more steps in a task may be executed based on a dialogue with the user 124. A dialogue may comprise inputs received from the user 124 and outputs generated by the system 100. The dialogue may include an initial request from the user 124. The dialogue may include a response, from the system 100, that resolves the user request. The dialogue may include a request, generated by system 100, for additional information from the user 124.

In one or more embodiments, the user communication device 118 includes hardware and/or software configured to facilitate communication with the user 124. The user communication device 118 may receive information from the user 124. The user communication device 118 may transmit information to the user 124. The user communication device may facilitate communication with the user 124 via an audio interface 120 and/or a visual interface 122. The user communication device 118 is communicatively coupled to query system 102.

In an embodiment, the user communication device 118 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In an embodiment, the user communication device 118 is a smart speaker. The smart speaker receives audio data from user 124. The smart speaker plays audio. The smart speaker transmits information to and from query system 102. The smart speaker may be implemented as a stand-alone device, or as part of a smart device such as a smartphone, tablet, or computer.

In one or more embodiments, audio interface 120 refers to hardware and/or software configured to facilitate audio communication between user 124 and the user communication device 118. The audio interface 120 may include a speaker to play audio. The played audio may include verbal questions and answers comprising a dialogue. The audio interface may include a microphone to receive audio. The received audio may include requests and other information received from the user 124.

In one or more embodiments, visual interface 122 refers to hardware and/or software configured to facilitate visual communications between a user and the user communication device 118. The visual interface 122 renders user interface elements and receives input via user interface elements. Examples of visual interfaces include a graphical user interface (GUI) and a command line interface (CLI). Examples of user interface elements include checkboxes, radio buttons, dropdown lists, list boxes, buttons, toggles, text fields, date and time selectors, command lines, sliders, pages, and forms.

The visual interface 122 may present a messaging interface. The messaging interface may be used to accept typed input from a user (e.g., via a keyboard coupled to the user communication device 118 and/or a soft keyboard displayed via the visual interface). The messaging interface may be used to display text to the user 124. The visual interface 122 may include functionality to display images, such as maps and pictures. The visual interface 122 may include functionality to upload an image. As an example, the user 124 uploads a picture of an animal, along with the text, "What is this?".

In an embodiment, the query system 102 is a system for executing one or more tasks, responsive to input from the user 124 via user communication device 118. The query system 102 may receive voice input, text input, and/or images, from the user communication device 118.

The query system 102 may include a speech recognition component 108 for converting voice input to text using speech recognition techniques. The speech recognition component 108 may digitize and/or filter received voice input. The speech recognition component 108 may compare the voice input to stored template sound samples to identify words or phrases. The speech recognition component 108 may separate the voice input into components for comparison with sounds used in a particular language.

In an embodiment, one or more components of the speech recognition component 108 use a machine learning engine 110. In particular, the machine learning engine 110 may be used to recognize speech and determine a meaning associated therewith. Machine learning includes various techniques in the field of artificial intelligence that deal with computer-implemented, user-independent processes for solving problems that have variable inputs.

In some embodiments, the machine learning engine 110 trains a machine learning model 112 to perform one or more operations. Training a machine learning model 112 uses training data to generate a function that, given one or more inputs to the machine learning model 112, computes a corresponding output. The output may correspond to a prediction based on prior machine learning. In an embodiment, the output includes a label, classification, and/or categorization assigned to the provided input(s). The machine learning model 112 corresponds to a learned model for performing the desired operation(s) (e.g., labeling, classifying, and/or categorizing inputs). As a particular example, training may include causing an individual speaker to read particular text or isolated vocabulary into the system. The system analyzes the speaker's specific voice and uses it to fine-tune the recognition of that person's speech.

In an embodiment, the machine learning engine 110 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 110 receives positive and/or negative reinforcement in the process of attempting to solve a particular problem (e.g., to optimize performance in a particular scenario, according to one or more predefined performance criteria). In an embodiment, the machine learning engine 110 initially uses supervised learning to train the machine learning model 112 and then uses unsupervised learning to update the machine learning model 112 on an ongoing basis.

In an embodiment, a machine learning engine 110 may use many different techniques to label, classify, and/or categorize inputs. A machine learning engine 110 may transform inputs into feature vectors that describe one or more properties ("features") of the inputs. The machine learning engine 110 may label, classify, and/or categorize the inputs based on the feature vectors. Alternatively or additionally, a machine learning engine 110 may use clustering (also referred to as cluster analysis) to identify commonalities in the inputs. The machine learning engine 110 may group (i.e., cluster) the inputs based on those commonalities. The machine learning engine 110 may use hierarchical clustering, k-means clustering, and/or another clustering method or combination thereof. For example, the machine learning engine 110 may receive, as inputs, one or more parsed query terms, and may identify one or more additional parsed query terms for inclusion in a search based on commonalities among the received parsed query terms. In an embodiment, a machine learning engine 110 includes an artificial neural network. An artificial neural network includes multiple nodes (also referred to as artificial neurons) and edges between nodes. Edges may be associated with corresponding weights that represent the strengths of connections between nodes, which the machine learning engine 110 adjusts as machine learning proceeds. Alternatively or additionally, a machine learning engine 110 may include a support vector machine. A support vector machine represents inputs as vectors. The machine learning engine 110 may label, classify, and/or categorizes inputs based on the vectors. Alternatively or additionally, the machine learning engine 110 may use a naïve Bayes classifier to label, classify, and/or categorize inputs. Alternatively or additionally, given a particular input, a machine learning model may apply a decision tree to predict an output for the given input. Alternatively or additionally, a machine learning engine 110 may apply fuzzy logic in situations where labeling, classifying, and/or categorizing an input among a fixed set of mutually exclusive options is impossible or impractical. The aforementioned machine learning model 112 and techniques are discussed for exemplary purposes only and should not be construed as limiting one or more embodiments.

As a particular example, the machine learning engine 110 may be based on a Hidden Markov Model (HMM). The HMM may output a sequence of symbols or quantities. HMMs may be used in speech recognition because a speech signal can be viewed as a piecewise stationary signal or a short-time stationary signal. In a short time-scale (e.g., 10 milliseconds), speech can be approximated as a stationary process. Speech can be thought of as a Markov model for many stochastic purposes.

HMMs may be trained automatically and are simple and computationally feasible to use. In speech recognition, the HMM may output a sequence of multi-dimensional real-valued vectors, with a vector output periodically (e.g., every 10 milliseconds). Each vector may include coefficients obtained by applying an algorithm (e.g., a Fourier transform) to a short time window of speech, and using the most significant coefficients. Each word or phoneme may have a different output distribution. A hidden Markov model for a sequence of words or phonemes is made by concatenating the individual trained hidden Markov models for the separate words or phonemes. Decoding of the speech may use an algorithm (e.g., the Viterbi algorithm) to find a best path.

Neural networks may also be used in speech recognition. In particular, neural networks have been used in many aspects of speech recognition such as phoneme classification, phoneme classification through multi-objective evolutionary algorithms, and isolated word recognition.

Neural networks may be used to estimate the probabilities of a speech feature segment, and allow discriminative training in a natural and efficient manner. In particular, neural networks may be used in pre-processing, feature transformation or dimensionality reduction, step prior to HMM based recognition. Alternatively, recurrent neural networks (RNNs) and/or Time Delay Neural Networks (TDNN's) may be used.

In an embodiment, as a machine learning engine 110 applies different inputs to a machine learning model 112, the corresponding outputs are not always accurate. As an example, the machine learning engine 110 may use supervised learning to train a machine learning model 112. After training the machine learning model 112, if a subsequent input is identical to an input that was included in labeled training data and the output is identical to the supervisory signal in the training data, then output is certain to be accurate. If an input is different from inputs that were included in labeled training data, then the machine learning engine 110 may generate a corresponding output that is inaccurate or of uncertain accuracy. In addition to producing a particular output for a given input, the machine learning engine 110 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

The speech recognition component 108 may use natural language processing to identify one or more executable commands, based on text generated from the audio input. The query system 102 may parse the text to determine one or more relevant portions of the text.

In particular, the speech recognition component may parse the text to locate a wake word or phrase (e.g., a word used to indicate that the user intends to issue a command to the virtual assistant) and a command word or phrase subsequent to the wake word. The query system 102 may identify keywords in the command. The query system 102 may compare the command to template language associated with a task executable by the query system 102.

In an embodiment, the query system 102 is implemented remotely from the user communication device 118. The query system 102 may execute on a cloud network. Alternatively, the query system 102 may execute locally to the user communication device 118. The query system 102 may execute tasks or retrieve information from one or more external servers. As an example, the query system 102 may retrieve traffic data from a third-party map application.

In an embodiment, the query system 102 includes a context information collector 104 that determines context information associated with a user communication device 118. The context information collector 104 may receive data from the user communication device 118. As an example, the query system may query the user communication device 118 to determine a location of the user communication device via a Global Positioning System (GPS) functionality or other geolocation service. As another example, the query system 102 may query the user communication device 102 to determine information regarding a state of the user communication device 118. In particular, the query system may request the set of applications being executed when the initial command was received, the last application accessed by the user prior to receipt of the initial command, and/or a configuration of the device when the initial command was received. Additionally or alternatively, the query system 102 may query the user communication device 118 to determine a time at which the initial command was received.

The query system may, at least in part, rely on user input history 106 in determining operations to execute. In an embodiment, the user input history 106 is a record of user input over the course of one or more dialogues. User input history 106 may include information about the sequence of a series of voice inputs. User input history 106 may categorize user input by type. For example, the user creates a shopping list on Thursdays at 6 pm.

The query system 102 may include a command execution component 116 for executing a command based on the received audio input. The command execution component 115 may include executing the command and/or scheduling the command to be executed in the future.

The query system 102 may include an audio input storage and retrieval component 114. The audio input storage and retrieval component 114 may communicate with a data repository 126 for purposes of storing at least a portion of an audio input as audio recording data. In some embodiments, the audio input storage and retrieval component 114 stores audio recording data associated with each received audio input. In other embodiments, the audio input storage and retrieval component 114 stores audio recording data associated with an audio input based on properties of the received audio input. For example, the audio input storage and retrieval component 114 may store the audio recording data in response to a determination that the speech recognition component 108 was unable to determine one or more phonemes of the audio input, or that a confidence level associated with a determination of one or more phonemes falls below a confidence threshold. As another example, the audio input storage and retrieval component 114 may store the audio recording data in response to a determination that the command corresponds to an action to be scheduled for future execution (e.g., a reminder) and/or adding an item to a list.

In one or more embodiments, the data repository 126 is any type of storage unit and/or device (e.g., a file system, database, collection of tables, or any other storage mechanism) for storing data. Further, the data repository 126 may include multiple different storage units and/or devices. The multiple different storage units and/or devices may or may not be of the same type or located at the same physical site. Further, a data repository 126 may be implemented or may execute on the same computing system as the query system 102 and/or the user communication device 118. Alternatively or additionally, a data repository 126 may be implemented or executed on a storage and/or computing system separate from the query system 102 and/or the user communication device 118. A data repository 126 may be communicatively coupled to the query system 102 and/or the user communication device 118 via a direct connection or via a network.

Audio recording data 128 includes at least a portion of the audio recording received from the user communication device as a user command. For example, the audio recording data may include the entirety of the audio data received (e.g., a wake word and a command). As another example, the audio recording data may include less than the entirety of the received audio data (e.g., the command, without the wake word). The audio recording data may be stored in any format that can be reproduced at the user communication device.

Context information 130 includes context information associated with a user communication device 118 and/or a user 124 at a time the user issued a command (e.g., at a time when an audio recording is sent from the user communication device 118 to the query system 102. As examples, the context information may include positional data indicating a location of a user communication device at a time when a command was issued, application information indicating other applications executing at a time when a command was issued and/or a last-accessed application prior to receipt of the command, configuration information indicating a configuration of the device when the initial command was received, timing information indicating a time and/or date when the command was received, and/or other information indicating a state of the user communication device at a time when a command was issued.

Scheduled action information 132 may include information associated with an action scheduled to take place at a future time based on a received audio input. For example, the scheduled action information may include a command identifier associated with the scheduled action, a time at which the action is to occur, or other information associated with the scheduled action.

Mapping information 134 may include information associating audio recording data and/or context information with a particular command issued by the user. In embodiments, the mapping information associates particular audio recording data and/or particular context data with particular scheduled action information. This data may be used to retrieve stored audio recording data and/or context information responsive to execution of the particular action and/or a request for information associated with a particular command.

3. Drill Back to Audio Recording in Virtual Assistant

Figure 2:
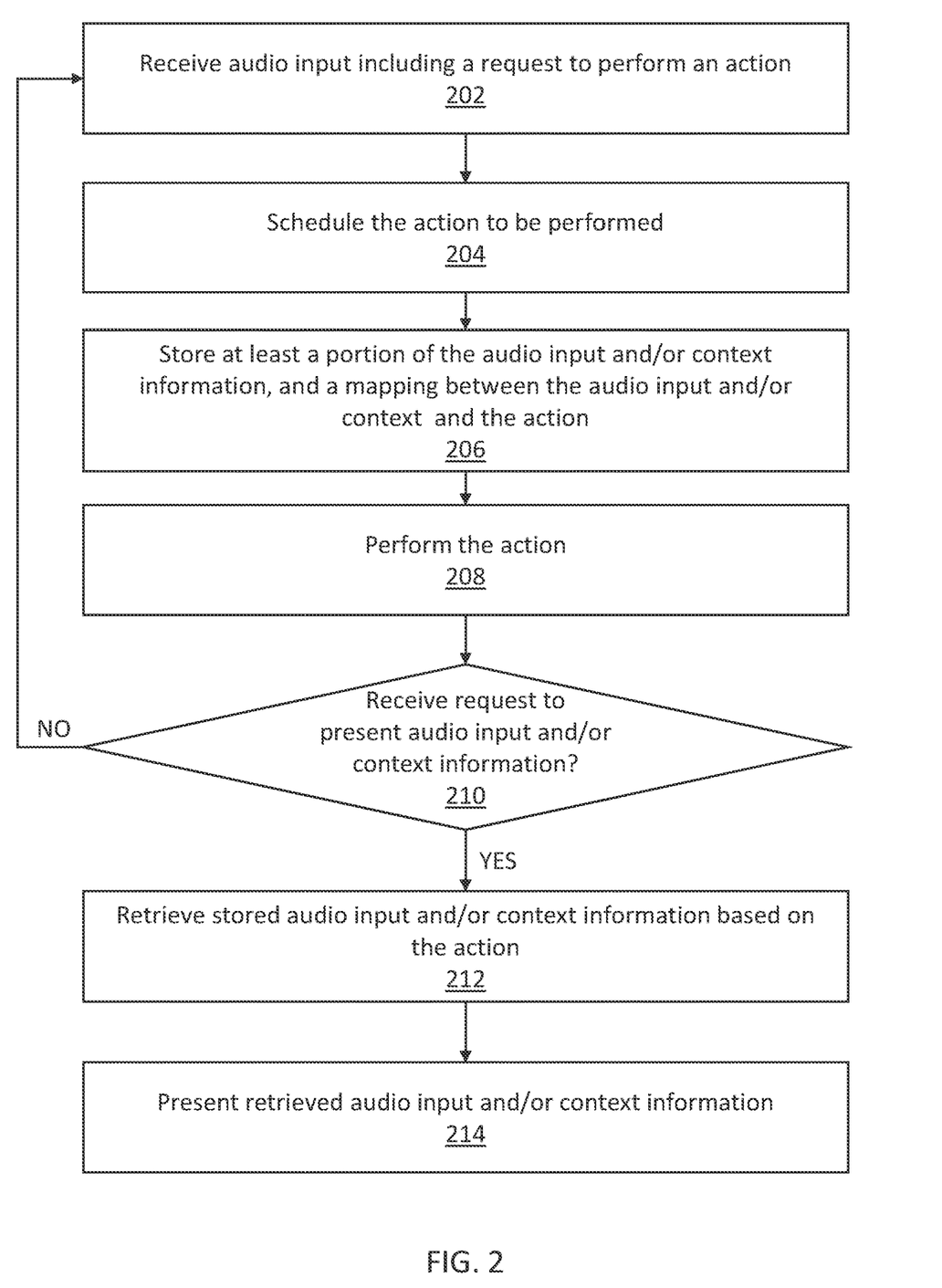
FIG. 2 illustrates an example set of operations for drilling back to audio recordings using a virtual assistant in accordance with one or more embodiments.

FIG. 2 illustrates an example set of operations for drilling back to an original audio recording using a virtual assistant in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, the query system may receive audio input including a request to perform an action (Operation 202). The audio input is received via a microphone (e.g., via a user communication device as discussed above) system input. In some embodiments, the audio input includes a wake word (a word that prepares the system to receive a command) in addition to a command (one or more words that causes the system to perform an action). In embodiments, the command may be of a type that causes the system to execute an action but does not provide specific, immediate feedback to a user.

The system may parse the audio input to divide the audio input into multiple sections. For example, the system may divide the audio input into a wake word section and a command section. In some embodiments, the system may convert the received audio input to text. The system may process one or more (e.g., each) section the audio input using natural language processing to generate a transcript of the section. In some embodiments, the system may determine, for each section transcribed, a confidence score associated with the transcript of the section.

In an embodiment, the system schedules the action to be performed (Operation 204). In embodiments, scheduling the action to be performed may include determining an action to be performed based on the received audio input. In some embodiments, the command may be of a type that causes the system to perform an action at a time in the future. In particular, the system may receive a command "Remind me to call John next Thursday at noon." In response to the command, the system may schedule a reminder that will cause the system to prompt the user with the phrase "Call John" on the following Thursday at 12:00 μm. In some embodiments, the system may provide feedback to the user such as "Reminder set," or "OK, I'll remind you," but may not provide specific feedback in the form of what the reminder text will be.

As another example, the command may be of a type that adds an entry to a list. In particular, the system may receive a command "Add milk to my grocery list." In response, the system may add a list item "milk" to a list. In some embodiments, the system may provide feedback to the user such as "OK, I've added it to your list," without specifying what the list item is.

The system may parse the audio input to divide the audio input into multiple sections. For example, the system may divide the audio input into a wake word section and a command section. In some embodiments, the system may convert the received audio input to text. The system may process one or more (e.g., each) sections of the audio input using natural language processing to generate a transcript of the section(s). In some embodiments, the system may determine, for each section transcribed, a confidence score associated with the transcript of the section.

In embodiments, the system stores a mapping between the command and the stored audio input and/or stored context information. For example, each command may be associated with a particular identifier, and the identifier may be stored in combination with the audio input and/or context information.

In embodiments, the system may store the audio input and/or the context information based on one or more properties of the audio input. For example, the system may determine a command type associated with the audio input. The system may determine whether or not to store the audio input and/or the context information based on the command type.

In some embodiments, the system may store the audio input and/or the context information based on the confidence score of the transcript the audio input. For example, the system may store the audio input and/or the context information based on a determination that a confidence score associated with at least one section of the audio input does not exceed a particular threshold.

In some embodiments, storing the at least a portion of the audio input comprises storing the entirety of the audio input. In some embodiments, storing the at least a portion of the audio input comprises parsing the audio input to determine a particular portion of the audio input associated with the command, and storing only the portion of the audio input associated with eh command.

The system may perform an action requested by the user (Operation 208). That is, the system may execute an action according to a command portion of the audio input. In some embodiments, the system may perform the action substantially contemporaneously with receiving the audio input. For example, responsive to receiving audio input that includes the command "Add milk to my grocery list," the system may add the item "milk" to a grocery list. In some embodiments, the system may perform the action at a time subsequent to receiving the audio input. For example, the system may receive audio input that includes the command "Remind me to call John next Thursday at noon." The system may refrain from executing the action (e.g., providing the reminder until the time specified in the command (e.g., Thursday at noon). At the specified time, the system performs the action of reminding the user to call John. For example, the system may present a graphical and/or audio reminder to the user.

In some embodiments, performing the action includes indicating that one or more of audio input or context information associated with the action are stored. For example, the system may display an icon indicating that context information and/or audio input data associated with the action is stored.

Responsive to performing the action, the system may receive a request to present the stored context information and/or audio input data (Operation 210). In embodiments, the request may include clicking or otherwise actuating a displayed icon. Alternatively or additionally, the request may include a subsequent audio request to present the stored information. As an example, subsequent to the system performing the action, the user may issue the voice command "Replay my original audio."

In some embodiments, when a system receives the request to present the stored context information and/or audio input data, the system may mark at least the stored portion of the audio input for use in training data for the system. That is, the system may determine that, based on the request, there is an error in the transcription. The audio input may be used in training to help increase accuracy of future transcriptions.

In some embodiments, performing the action includes indicating that one, or both, of audio input or context information associated with the action are stored. For example, the system may display an icon indicating that context information and/or audio input data associated with the action is stored.

The system may present the retrieved context information and/or audio input data (Operation 214). Presenting the context information and/or audio input data includes playing at least a portion of the retrieved audio data. In some embodiments, the system may play the entirety of the retrieved audio data. Alternatively, the system may play a portion of the retrieved audio data corresponding to the command. Additionally or alternatively, presenting the context information and/or audio input data includes presenting retrieved context information. The retrieved context information may be presented graphically on a display, played audibly (e.g., using a text to speech algorithm), and/or provided via a message (e.g., an email, text message, log file, or other message).

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
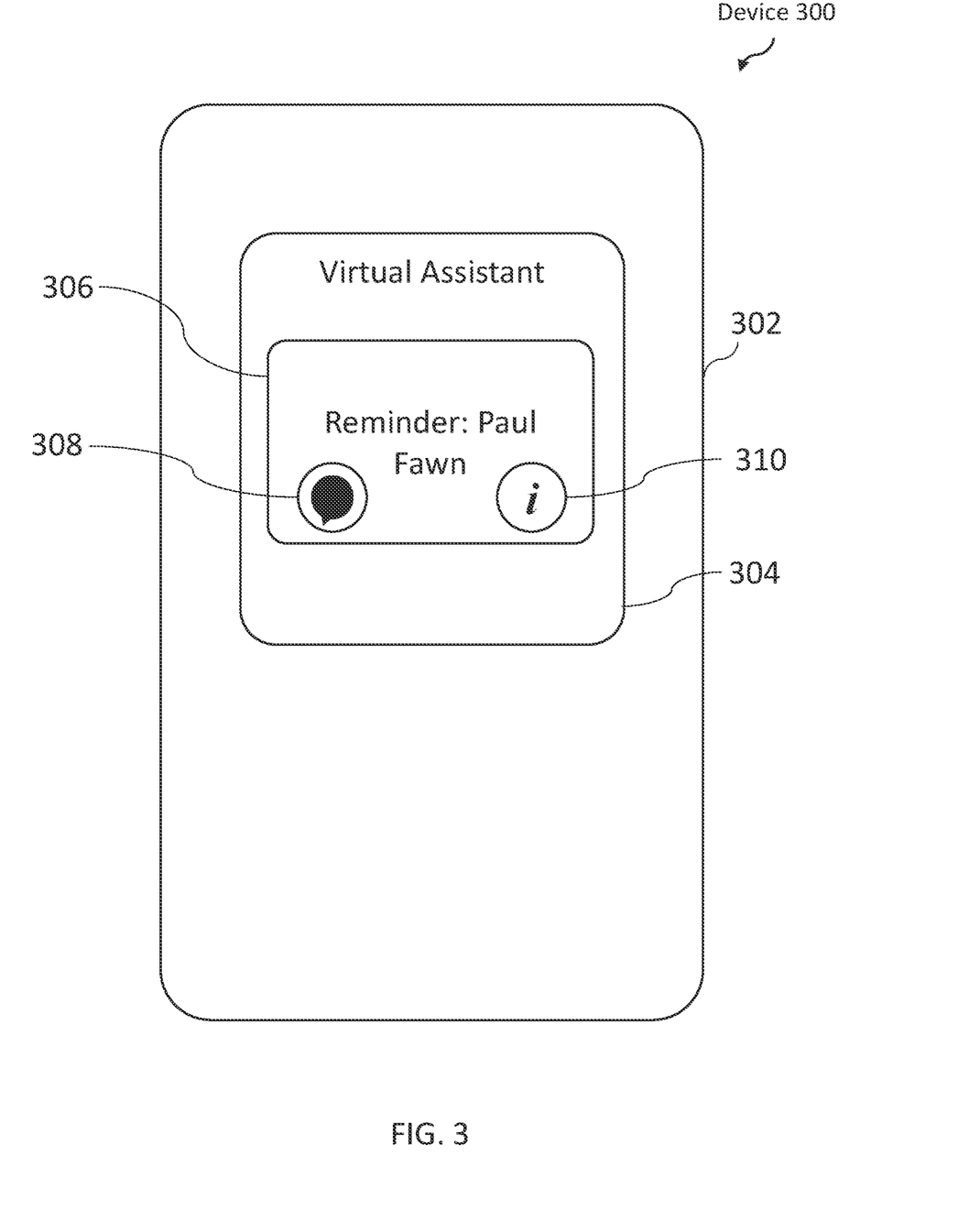
FIG. 3 illustrates an example device using a virtual assistant platform in accordance with one or more embodiments.

FIG. 3 illustrates an example device 300 using a virtual assistant platform. The user has previously provided audio input including a command "Remind me to call John next Thursday at noon."

The virtual assistant platform 304 performs speech to text analysis on the audio input. A transcription error in the speech to text process causes the virtual assistant platform to transcribe the command received by the user as "Remind me to Paul Fawn next Thursday at noon." Accordingly, the virtual assistant platform schedules a reminder for Thursday at noon, including the text "Paul Fawn." The system also stores the audio input and context information associated with the device at the time the audio input was received.

At noon on Thursday, the virtual assistant platform 304 causes the device 300 to present the scheduled reminder 306 on a display 302. The reminder 306 includes the mistranscribed text "Paul Fawn." The reminder 306 includes an icon 308 indicating that the virtual assistant platform stored the audio input that resulted in the platform scheduling the reminder. The reminder 306 includes an icon 310 indicating that the virtual assistant platform stored context information associated with the device at the time the audio input was received.

The user may request that the audio input that resulted in the platform scheduling the reminder be replayed by clicking or otherwise actuating the icon 308 and/or by issuing a voice command such as "Replay original audio." Responsive to such a command, the virtual assistant 304 may retrieve and play the stored audio input.

The user may request that the context information associated with the device at the time the audio input was received be present by clicking or otherwise actuating the icon 310 and/or by issuing a voice command such as "Show context information." Responsive to such a command, the virtual assistant 304 may retrieve and display the stored context information.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
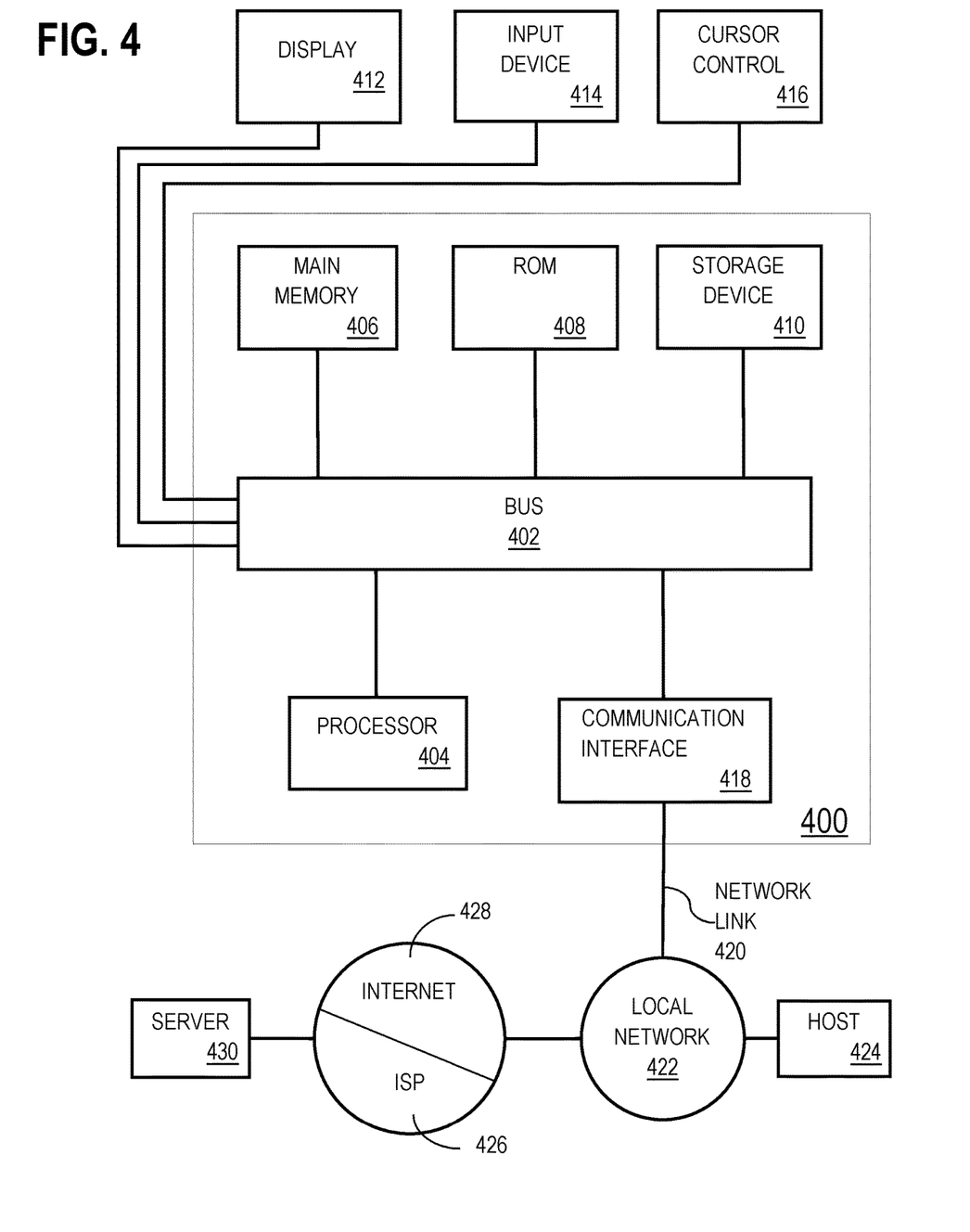
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   receiving, by a virtual assistant platform, a first audio input comprising a first request;
   based on the first request, scheduling an action to be performed by the virtual assistant platform;
   determining that at least a portion of the first audio input includes one or more phonemes associated with a first confidence level below a threshold confidence level;
   responsive to determining that at least the portion of the first audio input includes one or more phonemes associated with the first confidence level below the threshold confidence level: storing (a) at least the portion of the first audio input and (b) a mapping between the action and at least the portion of the first audio input;
performing, by the virtual assistant platform, the action;
subsequent to performing the action: receiving, by the virtual assistant platform, a second request for audio playback of the first request corresponding to the action performed by the virtual assistant platform;
retrieving at least the portion of the first audio input based on the mapping between the action and at least the portion of the first audio input;
playing, by the virtual assistant platform, at least the portion of the first audio input comprising the first request.

2. The non-transitory computer readable medium of claim 1, the operations further comprising:
storing (a) context information from a time the first request was received and (b) a mapping between the action and the context information, wherein the context information comprises one or more of (i) a user location when the first request was received, (ii) the time at which the first request was received, and (iii) a list of applications running at the time the first request was received;
retrieving the context information based on the mapping between the action and the context information; and
presenting, by the virtual assistant platform, at least a portion of the context information.

3. The non-transitory computer readable medium of claim 1, wherein the storing the at least the portion of the first audio input and the mapping between the action and at least the portion of the first audio input is performed in response to evaluating one or more characteristics of the first audio input;
wherein the operations further comprise:
receiving, by the virtual assistant platform, a second audio input comprising a third request;
based on the third request, scheduling a second action to be performed by the virtual assistant platform;
evaluating one or more characteristics of the second audio input; and
refraining from storing any portion of the second audio input.

4. The non-transitory computer readable medium of claim 1, the operations further comprising:
determining a second confidence level that associated with scheduling the action to be performed based on the first request;
responsive to the second confidence level being below a confidence threshold, prompting a user to confirm the action.

5. The non-transitory computer readable medium of claim 1, wherein storing at least the portion of the first audio input comprises storing an entirety of the first audio input.

6. The non-transitory computer readable medium of claim 1, wherein playing at least the portion of the first audio input comprises playing an entirety of the first audio input.

7. The non-transitory computer readable medium of claim 1, the operations further comprising:
parsing the first audio input to divide the first audio input into a plurality of sections;
determining a particular section of the plurality of sections of the first audio input, that includes the first request;
wherein storing at least the portion of the first audio input comprises storing the particular section.

8. The non-transitory computer readable medium of claim 1, the operations further comprising:
parsing the first audio input to divide the first audio input into a plurality of sections;
generating, for each section of the plurality of sections of the first audio input, a transcript of audio content contained in the section;
determining, for each section of the plurality of sections of the first audio input, a likelihood that the transcript corresponding to the section includes any transcription error;
wherein storing at least the portion of the first audio input comprises storing at least a particular section associated with the greatest likelihood that a particular transcript corresponding to the particular section includes any transcription error.

9. The non-transitory computer readable medium of claim 1, the operations further comprising:
responsive to receiving the second request for audio playback of the first request corresponding to the action performed by the virtual assistant platform: marking at least the portion of the first audio input for inclusion in a training data set.

10. The non-transitory computer readable medium of claim 1, wherein the operations further comprise:
storing context information at a time the first request was received, wherein the context information comprises a list of applications running at the time the first request was received;
responsive to receiving the second request for audio playback of the first request:
retrieving the list of applications running at the time the first request was received; and
presenting, by the virtual assistant platform, at least a portion of the list of applications running at the time the first request was received.

11. The non-transitory computer readable medium of claim 1, wherein the operations further comprise:
receiving, by the virtual assistant platform, a second audio input comprising a third request;
determining that no portion of the second audio input includes any phoneme associated with any confidence level below the threshold confidence level;
responsive to determining that no portion of the second audio input includes any phoneme associated with any confidence level below the threshold confidence level:
refraining from storing any portion of the second audio input.

12. A method comprising:
receiving, by a virtual assistant platform, a first audio input comprising a first request;
based on the first request, scheduling an action to be performed by the virtual assistant platform;
determining that at least a portion of the first audio input includes one or more phonemes associated with a first confidence level below a threshold confidence level;
responsive to determining that at least the portion of the first audio input includes one or more phonemes associated with the first confidence level below the threshold confidence level: storing (a) at least the portion of the first audio input and (b) a mapping between the action and at least the portion of the first audio input;
performing, by the virtual assistant platform, the action;
subsequent to performing the action: receiving, by the virtual assistant platform, a second request for audio playback of the first request corresponding to the action performed by the virtual assistant platform;

retrieving at least the portion of the first audio input based on the mapping between the action and at least the portion of the first audio input;

playing, by the virtual assistant platform, at least the portion of the first audio input comprising the first request;

wherein the method is performed by at least one device including a hardware processor.

13. The method of claim 12, further comprising:

storing (a) context information from a time the first request was received and (b) a mapping between the action and the context information, wherein the context information comprises one or more of (i) a user location when the first request was received, (ii) the time at which the first request was received, and (iii) a list of applications running at the time the first request was received;

retrieving the context information based on the mapping between the action and the context information; and presenting, by the virtual assistant platform, at least a portion of the context information.

14. The method of claim 12, wherein the storing the at least a portion of the first audio input and the mapping between the action and at least the portion of the first audio input is performed in response to evaluating one or more characteristics of the first audio input;

wherein the method further comprises:
receiving, by the virtual assistant platform, a second audio input comprising a third request;
based on the third request, scheduling a second action to be performed by the virtual assistant platform;
evaluating one or more characteristics of the second audio input; and
responsive to evaluating the one or more characteristics: refraining from storing any portion of the second audio input.

15. The method of claim 12, further comprising:

determining a second confidence level that associated with scheduling the action to be performed based on the first request;

responsive to the second confidence level being below a confidence threshold, prompting a user to confirm the action.

16. The method of claim 12, wherein storing at least the portion of the first audio input comprises storing all of the first audio input.

17. The method of claim 12, further comprising:

parsing the first audio input to divide the first audio input into a plurality of sections;

determining a particular section of the plurality of sections of the first audio input, that includes the first request;

wherein storing at least the portion of the first audio input comprises storing the particular section.

18. The method of claim 12, further comprising:

parsing the first audio input to divide the first audio input into a plurality of sections;

generating, for each section of the plurality of sections of the first audio input, a transcript of audio content contained in the section;

determining, for each section of the plurality of sections of the first audio input, a likelihood that the transcript of the audio content contained in the section includes any transcription error;

wherein storing at least the portion of the first audio input comprises storing at least a particular section, among the plurality of sections, associated with the greatest likelihood that the transcript of the audio content contained in the section includes any transcription error.

19. The method of claim 12, further comprising:

responsive to receiving the second request for audio playback of the first request corresponding to the action performed by the virtual assistant platform: marking at least the portion of the first audio input for inclusion in a training data set.

20. A system comprising:

at least one device including a hardware processor;

the system being configured to perform operations comprising:

receiving, by a virtual assistant platform, a first audio input comprising a first request;

determining that at least a portion of the first audio input includes one or more phonemes associated with a first confidence level below a threshold confidence level;

responsive to determining that at least the portion of the first audio input includes one or more phonemes associated with the first confidence level below the threshold confidence level: based on the first request, scheduling an action to be performed by the virtual assistant platform;

storing (a) at least a portion of the first audio input and (b) a mapping between the action and at least the portion of the first audio input;

performing, by the virtual assistant platform, the action;

subsequent to performing the action: receiving, by the virtual assistant platform, a second request for audio playback of the first request corresponding to the action performed by the virtual assistant platform;

retrieving at least the portion of the first audio input based on the mapping between the action and at least the portion of the first audio input;

playing, by the virtual assistant platform, at least the portion of the first audio input comprising the first request.

21. The system of claim 20, the operations further comprising:

storing (a) context information from a time the first request was received and (b) a mapping between the action and the context information, wherein the context information comprises one or more of (i) a user location when the first request was received, (ii) the time at which the first request was received, or (iii) a list of applications running at the time the first request was received;

retrieving the context information based on the mapping between the action and the context information; and presenting, by the virtual assistant platform, at least a portion of the context information.

22. The system of claim 20, wherein the storing the at least a portion of the first audio input and the mapping between the action and at least the portion of the first audio input is performed in response to evaluating one or more characteristics of the first audio input;

wherein the operations further comprise:
receiving, by the virtual assistant platform, a second audio input comprising a third request;
based on the third request, scheduling a second action to be performed by the virtual assistant platform;
evaluating one or more characteristics of the second audio input; and
based on evaluating the one or more characteristics: refraining from storing any portion of the second audio input.

* * * * *

UNITED STATES PATENT AND TRADEMARK OFFICE
CERTIFICATE OF CORRECTION

PATENT NO. : 12,008,048 B2
APPLICATION NO. : 17/140783
DATED : June 11, 2024
INVENTOR(S) : Rodgers It is certified that error appears in the above-identified patent and that said Letters Patent is hereby corrected as shown below:

In the Specification

In Column 9, Line 28, delete "section" and insert -- sections of --, therefor.

In Column 9, Line 30, delete "section." and insert -- section(s). --, therefor.

In Column 9, Lines 55-64, delete "The system may parse the audio input to divide the audio input into multiple sections. For example, the system may divide the audio input into a wake word section and a command section. In some embodiments, the system may convert the received audio input to text. The system may process one or more ( e.g., each) sections of the audio input using natural language processing to generate a transcript of the section(s). In some embodiments, the system may determine, for each section transcribed, a confidence score associated with the transcript of the section." and insert -- The system may store information (e.g., at least a portion of the audio input and/or context information associated with the user and/or user device) in association with the scheduled action (Operation 206). The system may store at least a portion of the audio input. For example, the system may store the entirety of the audio input, a portion of the audio input corresponding to the command, a portion of the audio input that is unable to be interpreted by speech to text processing operating on the system, and/or any other portion of the audio input. Alternatively or additionally, the system may store context information. For example, the context information may include positional data indicating a location of a user communication device at a time when a command was issued, application information indicating other applications executing at a time when a command was issued and/or a last-accessed application prior to receipt of the command, configuration information indicating a configuration of the device when the initial command was received, timing information indicating a time and/or date when the command was received, and/or other information useful for providing context to the command. --, therefor.

In Column 10, Line 44, delete "one or more" and insert -- one, or both, --, therefor.

In Columns 10-11, Line 65-67 and 1-3, delete "In some embodiments, performing the action includes indicating that one, or both, of audio input or context information associated with the action are stored.

Signed and Sealed this
Eighth Day of October, 2024

Katherine Kelly Vidal
*Director of the United States Patent and Trademark Office*

For" and "example, the system may display an icon indicating that context information and/or audio input data associated with the action is stored." insert -- Responsive to the request to present the stored context information and/or audio input data, the system may retrieve the stored context information and/or audio input data (Operation 212). The system may determine a most recent previous action and an identifier associated with the action. The system may determine, based on stored mapping information, context information and/or audio input data associated with the action. Based on this association, the system may retrieve the context information and/or audio input data by known means, such as by reading the context information and/or audio input data from a data repository. --, therefor.